United States Patent [19]

Graham

[11] Patent Number: 4,973,107
[45] Date of Patent: Nov. 27, 1990

[54] DUAL PRESSURE AIR BRAKE SYSTEM

[76] Inventor: John M. Graham, 930 Peninsula Ave. #205, San Mateo, Calif. 94403

[21] Appl. No.: 430,755

[22] Filed: Nov. 1, 1989

[51] Int. Cl.$^5$ ............................................. B60T 13/44
[52] U.S. Cl. .................................. 303/9.76; 188/170; 303/2
[58] Field of Search ............. 188/170; 303/2, 9, 9.61, 303/9.66, 9.76, 13, 52

[56] References Cited

U.S. PATENT DOCUMENTS

| | | | |
|---|---|---|---|
| 3,456,988 | 7/1969 | Gibbons et al. | 303/2 |
| 4,003,605 | 1/1977 | Fannin | 303/9.76 |
| 4,191,428 | 3/1980 | Durling | 303/9.66 |
| 4,407,548 | 10/1983 | Graham | 303/9.76 |
| 4,589,704 | 5/1986 | Graham | 303/9.76 |

FOREIGN PATENT DOCUMENTS

| | | | |
|---|---|---|---|
| 1115267 | 5/1968 | Canada | 303/9.76 |
| 2131321 | 1/1973 | Fed. Rep. of Germany | 303/9.76 |
| 2526526 | 12/1975 | Fed. Rep. of Germany | 303/9.76 |
| 0115760 | 6/1986 | Japan | 303/9.76 |

*Primary Examiner*—Duane A. Reger
*Attorney, Agent, or Firm*—Townsend and Townsend

[57] ABSTRACT

A dual pressure vehicle air brake system (60, 61, 100, 101) made according to the invention includes first and second sources (62, 64) of pressurized air at, for example, 175 psi and 100 psi, respectively. A combination brake actuator (6) includes a conventional service brake chamber (8) adapted to accommodate the lower, second air pressure while the spring brake chamber (10) is made to accommodate the higher, first pressure. The use of the higher first pressure allows a stiffer actuator spring to be used and be fully deflected by the first pressure without substantially changing actuator piston areas and other elements of conventional combination brake actuators. A conventional modulated spring brake control valve (78) is used to supply air at the first pressure to the spring brake chamber. The service brake chamber is supplied with air at the second pressure through the outlet of a conventional service brake application valve (68). Compounding of brake forces, which could occur if both the service and spring brakes were applied simultaneously, may be reduced or eliminated using a conventional two-way check valve (50) or a novel shut off valve (102).

27 Claims, 7 Drawing Sheets

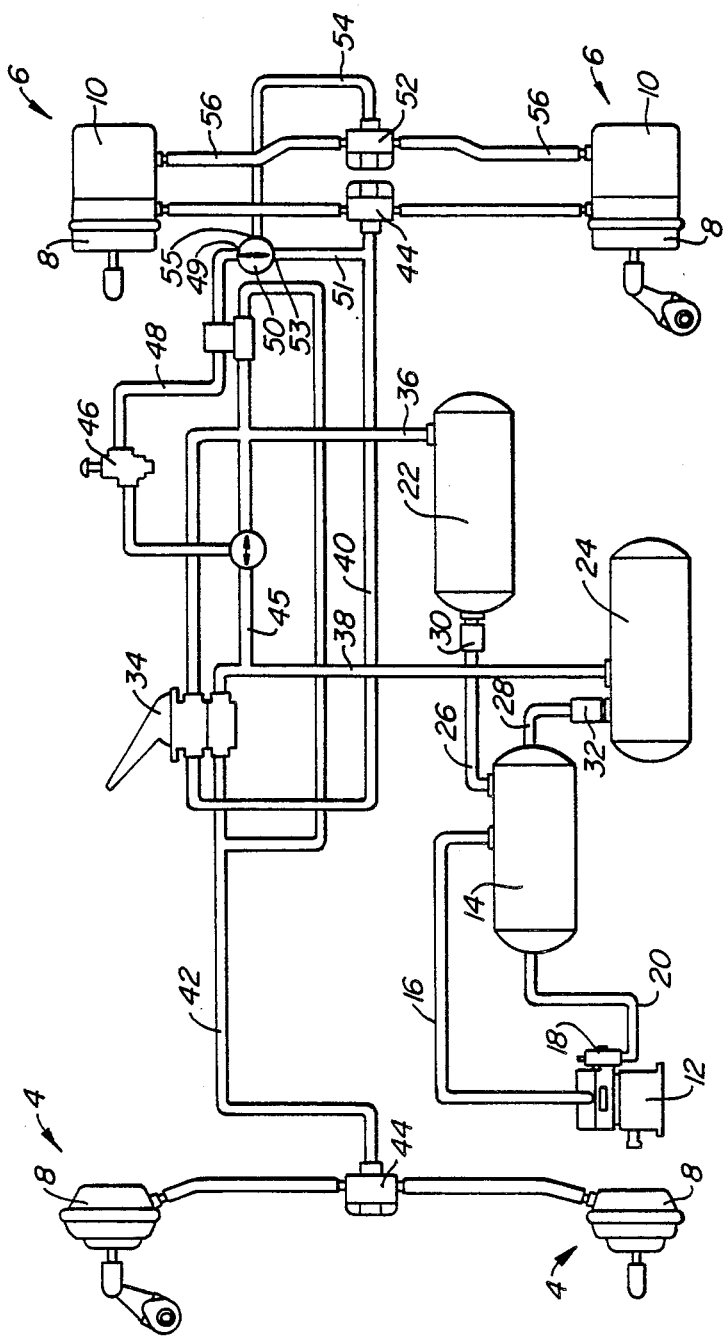
FIG._1. PRIOR ART

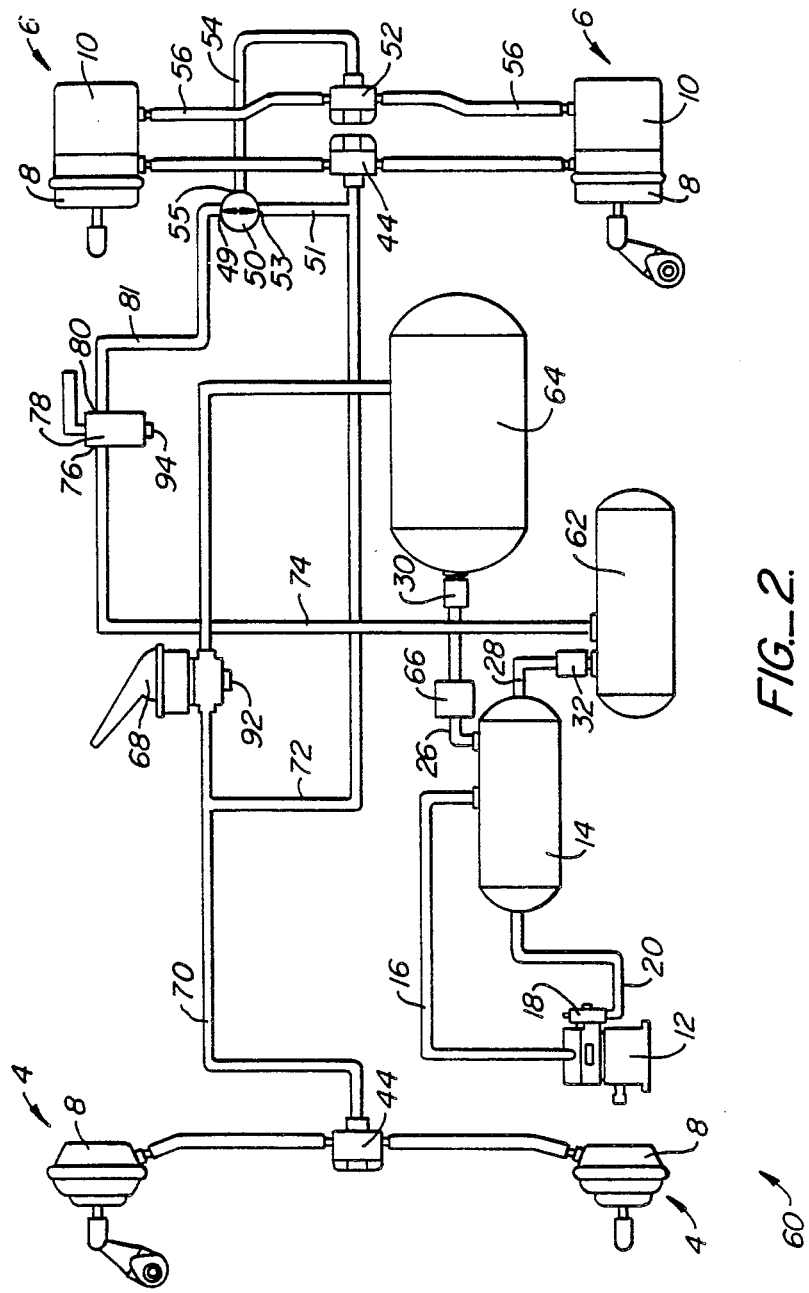
FIG._2.

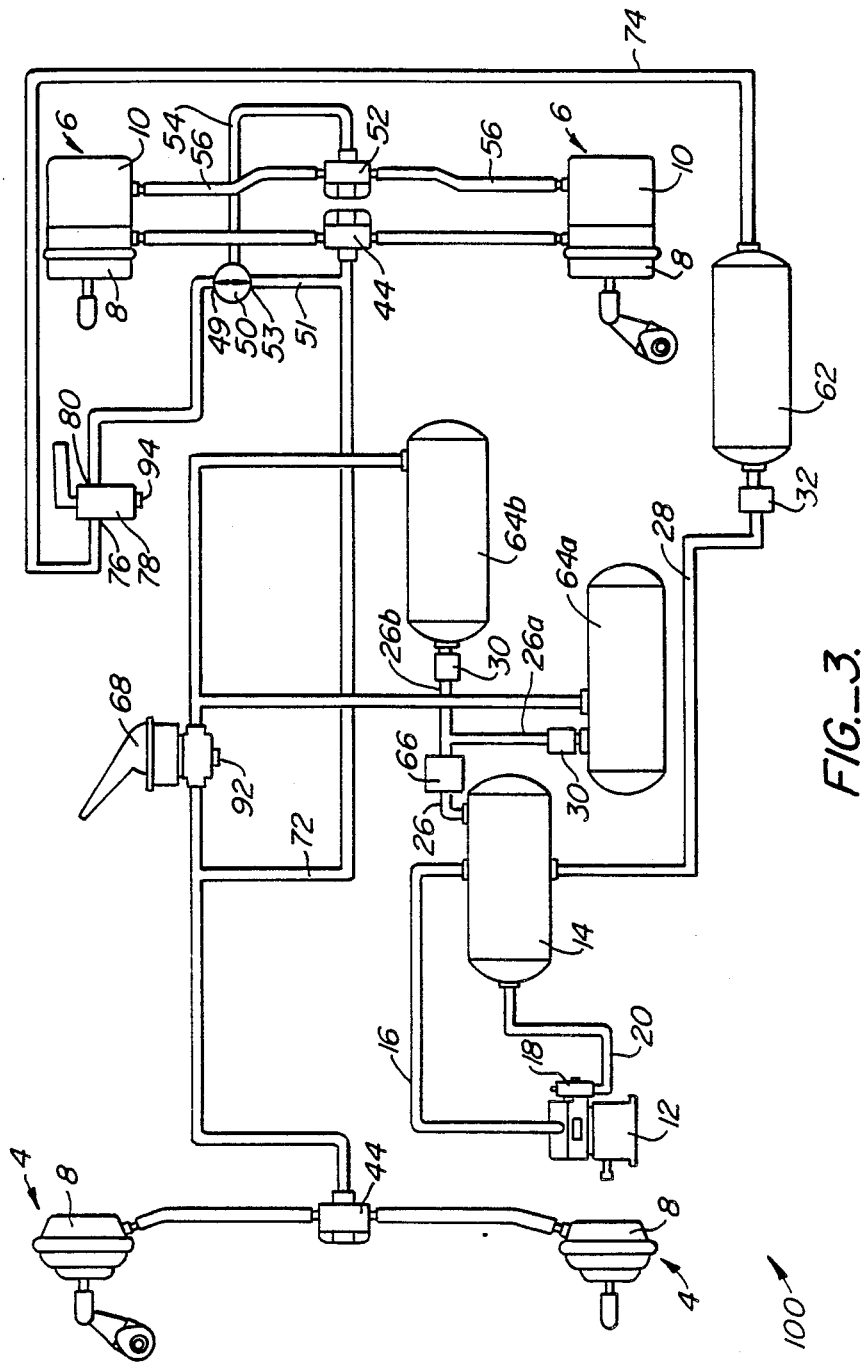
FIG._3.

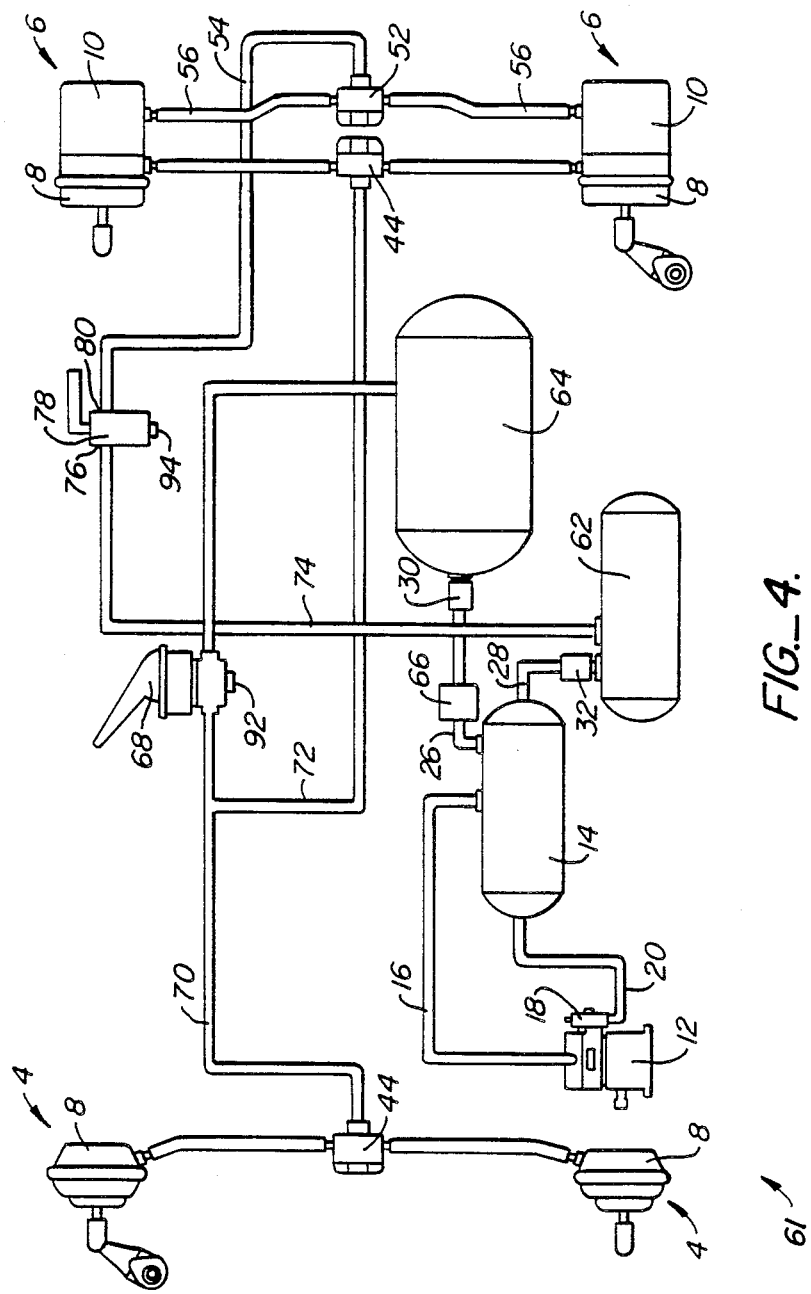
FIG._4.

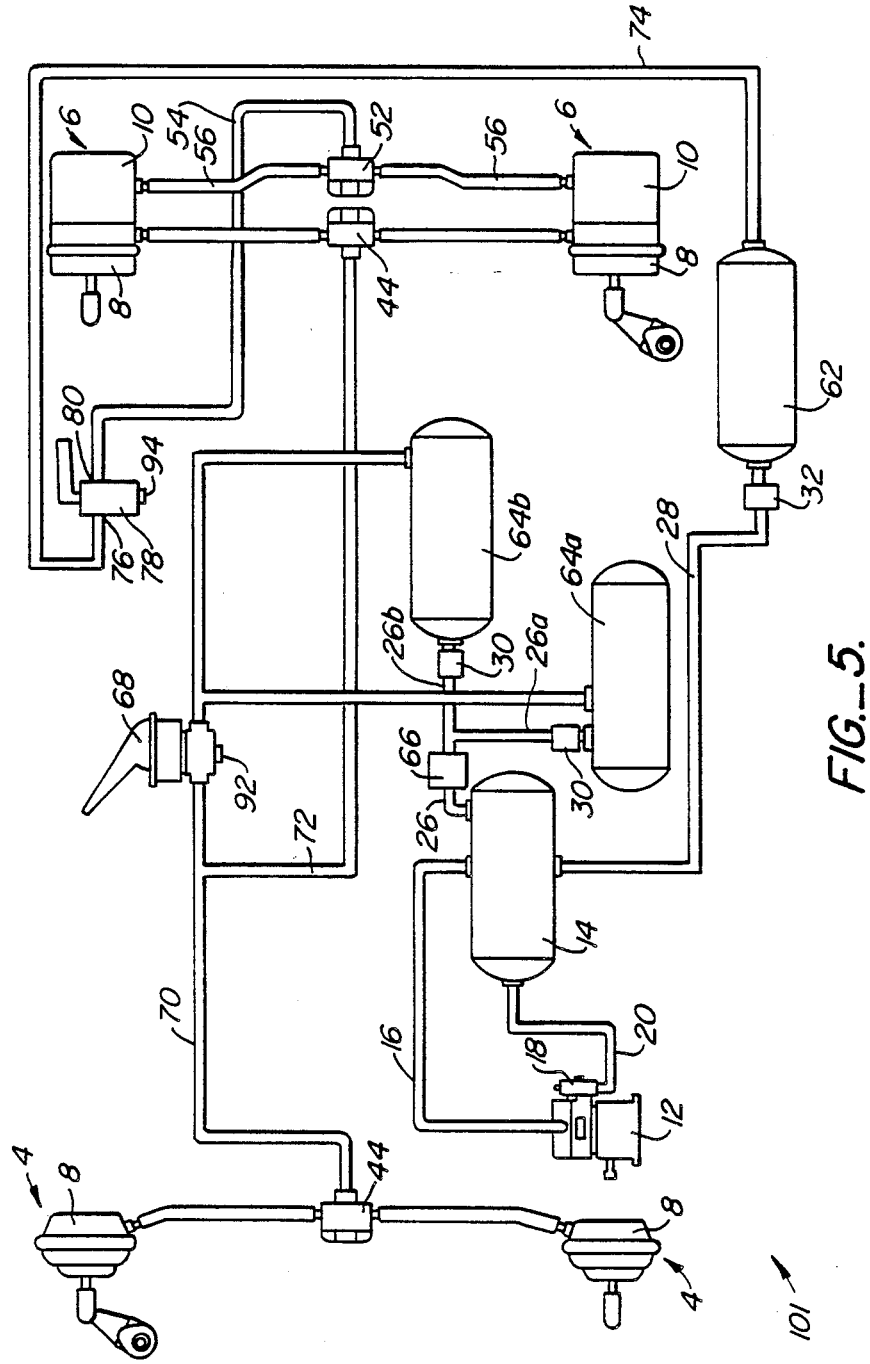
FIG._5.

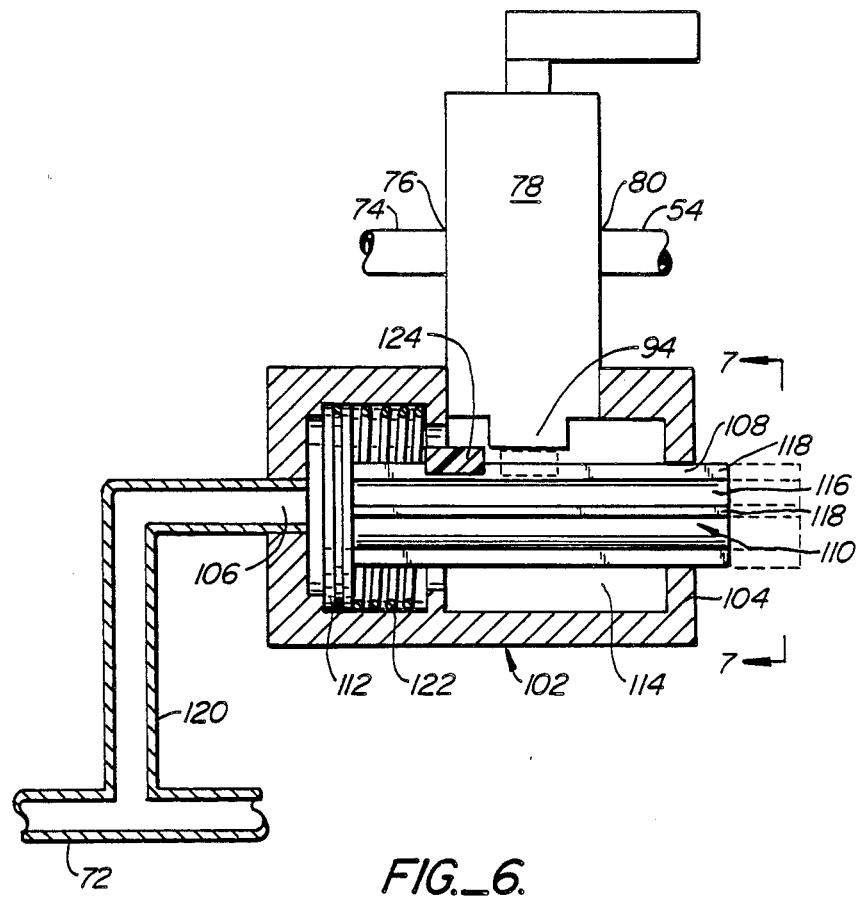
FIG._6.
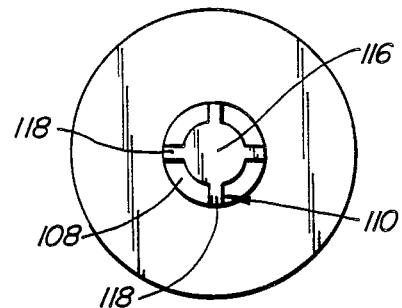
FIG._7.

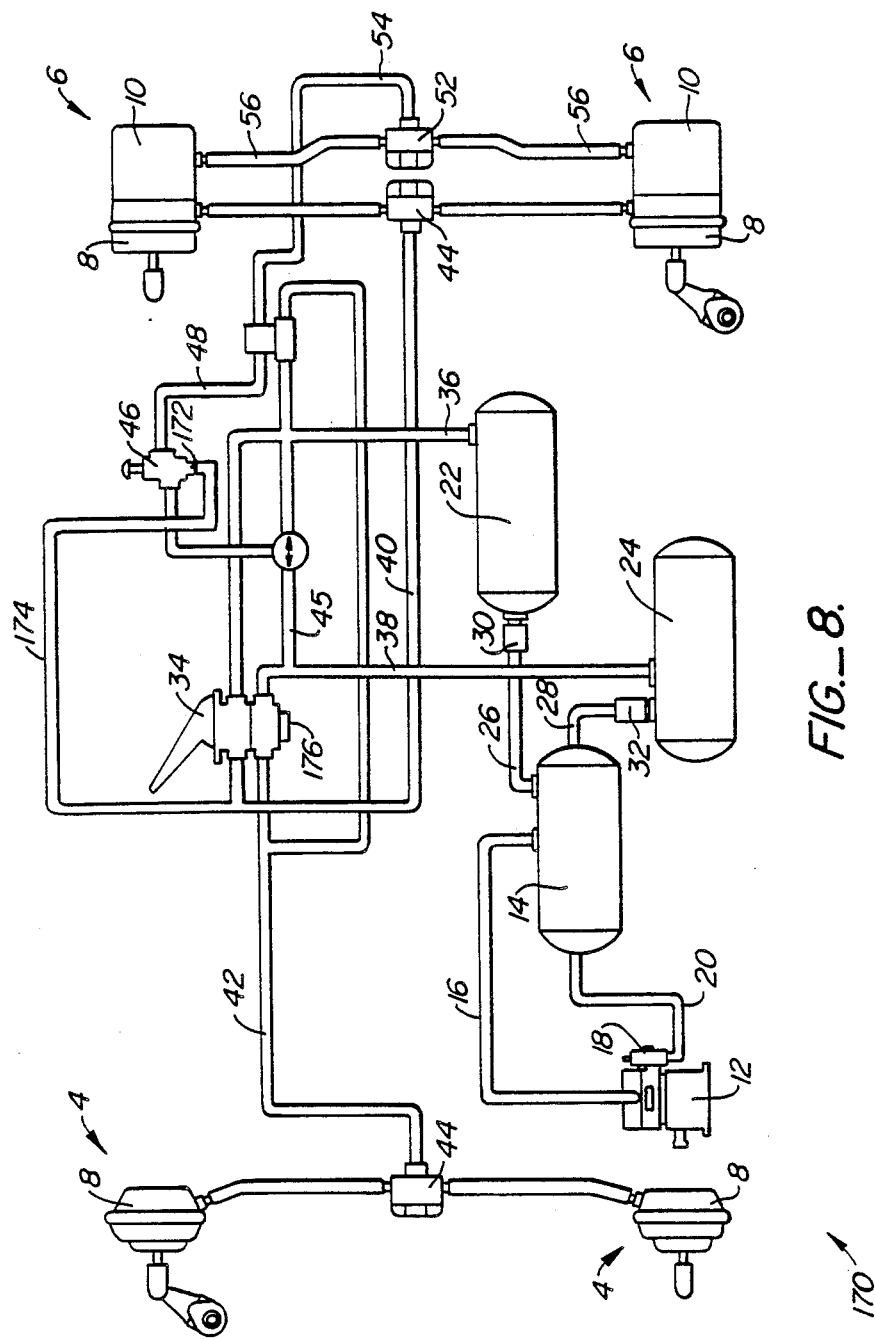
FIG._8.

DUAL PRESSURE AIR BRAKE SYSTEM

BACKGROUND OF THE INVENTION

Trucks, buses and other such vehicles typically use air brake systems. These brake system includes air actuated service brakes coupled to service brake actuators. Pressurized air, typically at 100 psi, is applied to the service brake chambers of the service brake actuators to apply the service brakes. To keep the brakes applied while parked, combination brake actuators are usually used. The combination brake actuators include a spring brake portion and a service brake portion. The spring and service brake portions include respective spring and service brake chambers. The spring brake portion also includes a heavy actuator spring coupled to the brake through an actuator piston. The actuator spring tends to apply the brakes. Supplying pressurized air to the service brake chambers applies the brakes (as discussed above) while supplying pressurized air to the spring brake chambers moves the actuator piston to compress the actuator spring to release the brakes. Thus, when parked, air is exhausted from both the spring brake chambers and the service brake chambers which allows the actuator springs to apply the brakes according to the force of the actuator springs.

One of the problems with these conventional air brake systems is that the braking force generated by the spring brake portion of the combination brake actuator is only about 50% of the maximum braking force generated by an applied service brake. Therefore, each axle with combination brake actuators has only about half of the braking force which is available with the service brake. Also, not all of the axles have combination brake actuators; often no more than half of the axles are so equipped. Although the resulting braking force is sufficient for parking purposes, in an emergency when service brake air pressure is lost, the braking force available is woefully inadequate.

SUMMARY OF THE INVENTION

The present invention is directed to a vehicle air brake system which uses air at two pressures. The higher pressure air is supplied to the spring brake chamber of combination brake actuators while the lower pressure air is supplied to the service brake chambers. By using a higher air pressure to compress the actuator springs, stiffer actuator springs can be used. The system permits much higher emergency braking force to be provided the operator than is now available without requiring extensive modifications to existing air brake systems.

The dual pressure air brake system includes first and second sources of pressurized air at, for example, 175 psi and 100 psi, respectively. The first and second pressure sources are coupled to a combination brake actuator which includes a conventional service brake chamber adapted to accommodate the lower, second air pressure from the second source. A conventional spring brake control valve may be used to supply air at the first pressure to the spring brake chamber. The combination actuator also includes a spring brake chamber made to accommodate the higher, first pressure. This is preferably accomplished by replacing the conventional actuator spring (which is made to be fully compressed by the lower second pressure) with a substantially stiffer actuator spring (made to be compressed by the higher first pressure). The use of the higher first pressure allows the stiffer actuator spring to be fully deflected by the first pressure without substantially changing the combination actuator, including the area of the actuator piston.

Conventional air brake systems may be made to reduce or eliminate compounding of braking forces. Compounding occurs when both service brake and spring brake forces are applied at the same time. Since this can damage the brakes, and possibly cause a loss of control, in some jurisdictions anti-compounding devices are required. One way of doing so is through the use of a two-way check valve, described below with reference to FIG. 1.

The present invention may also use a two-way check valve in generally the same manner to reduce or eliminate compounding. When so used, the spring outlet of the spring brake control valve is coupled to the first entrance port of the two-way check valve. The service brake chamber may be supplied with air at the second pressure from the outlet of a conventional service brake application valve (pedal valve). The outlet of the service brake application valve is also coupled to the second entrance port of the two-way check valve. The exit port of the two-way check valve is coupled to the spring brake chamber. In this way the air pressure supplied to the spring brake chamber is the larger of the pressures applied to the first and second entrance ports of the two-way check valve.

Compounding can be prevented or reduced using other techniques as well. One such alternative technique uses a normally open shut off valve which seals the exhaust port of the spring brake control valve whenever the service brake application valve is actuated. Thus, whenever the service brakes are applied, the exhaust port of the spring brake control valve is sealed so to prevent the spring brake chambers from being vented to atmosphere so to keep the spring brakes off.

The first and second pressures are preferably obtained by supplying a first tank, also called a wet tank, with pressurized air from a compressor at the first, higher pressure. A second tank, used to supply air to the service brake chambers, is coupled to the first tank through a pressure reducing valve so that the pressure within the second tank is at the second, lower pressure. A third tank is connected directly to the first tank without the need for a pressure reducing valve. The third tank supplies air to the spring brake chamber.

One of the primary advantages of the invention is that it can be carried out with very few modifications to a conventional air brake system. Also, since the spring brake can provide enough force to act as an emergency brake, as well as a parking brake, a single service brake application valve, as opposed to the dual pedal valves used with conventional split axle air brake systems, can be used. This further reduces costs, complexity, expense and weight of an air brake system made according to the invention.

Other features and advantages of the invention will appear from the following description in which the preferred embodiment has been set forth in detail in conjunction with the accompanying drawings.

BRIEF DESCRIPTION OF THE DRAWINGS

FIG. 1 shows a conventional dual axle air brake system.

FIG. 2 shows an air brake system made according to the invention.

FIG. 3 shows an alternative embodiment of the system of FIG. 2.

FIGS. 4 and 5 show air brake systems similar to that of FIGS. 2 and 3 but each is modified to eliminate the two way check valve.

FIG. 6 is a simplified cross-sectional view of a normally open shut off valve mounted to the modulated spring brake control valve.

FIG. 7 is an end view of the shut off valve of FIG. 6 taken along line 7—7.

FIG. 8 shows the air brake system of FIG. 1 incorporating the shut off valve of FIG. 6.

DETAILED DESCRIPTION OF THE PREFERRED EMBODIMENTS

At FIG. 1 a conventional dual axle air brake system 2 is shown to include service brake actuators 4 at the front axle and combination brake actuators 6 at the rear axle. Combination actuators 6 include a service brake chamber 8 and a spring brake chamber 10. Compressed air is supplied by a compressor 12 which feeds a supply or wet tank 14 with pressurized air from a line 16. The pressure within tank 14 is regulated by governor 18 coupled to tank 14 through a line 20. Governor 18 maintains the pressure within wet tank 14 at about 100 psi.

Wet tank 14 supplies pressurized air to a pair of supply tanks 22, 24 thorough lines 26, 28 and check valves 30, 32. Pressurized air within supply tanks 22, 24 is directed to a dual service brake application valve (dual pedal valve) 34 through lines 36, 38 to supply combination actuator 6 and service brake actuators 4 through lines 40, 42 and quick release valves 44. (Quick release valves 44 do not change the operation of air brake systems but permit faster operation by exhausting air from service brake chambers 8 through valves 44 rather than requiring the air to exhaust through valve 34.) Thus, actuation of valve 34 by the operator applies pressurized air to service brake chambers 8 at both the front and rear axles. Dual tanks 22, 24, dual application valve 34 and their associated lines are used to help prevent a loss of service brake air pressure at one axle from affecting the service brake air pressure at the other axle.

Air passes through line 38, through lines 45, 48, and through a parking brake control valve 46 positioned along line 48. Line 48 couples control valve 46 with a first entrance port 49 of a two-way check valve 50. A line 51 couples a second entrance port 53 of two-way check valve 50 to line 40. Two-way check valve 50 supplies air to a quick release valve 52 through its exit port 55 and a line 54 so that pressurized air is supplied to spring brake chambers 10 along lines 56 when either line 48 or line 40 is supplied with pressurized air. Therefore, spring brake chambers 10 are pressurized, thus releasing the associated spring brakes, whenever the service brakes are applied to avoid compounding of the service and spring brake forces (that is the application of service and spring brake forces at the same time). Compounding may be considered undesirable because the excessive braking force which would be applied could cause the operator to lose control of the vehicle and could damage the brake components.

Referring now to FIG. 2, an air brake system 60 made according to the invention is seen to be similar to conventional air brake system 2 of FIG. 1 and has like elements generally identified with like reference numerals. Governor 18 maintains wet tank 14 at a higher pressure, typically 175 psi, than in the conventional system of FIG. 1 for the reasons discussed below. A spring brake supply tank 62 is supplied with pressurized air at 175 psi while a service brake supply tank 64 is supplied with pressurized air at 100 psi through the use of a pressure reducing valve 66 along line 26. (It is preferred that the higher pressure in spring brake supply tank 62 be sufficiently high so that application of the spring brakes only supplies sufficient braking force to be effective as an emergency brake and not just a parking brake. Based upon the braking force available with conventional combination brake actuators, the higher pressure in tank 62 should be at least about 50% greater than the pressure in service brake supply tank 64.) Pressurized air from service brake supply tank 64 is supplied to service brake chambers 8 through the actuation of a service brake application valve (a single pedal valve) 68 which directs pressurized air, when actuated, through lines 70, 72 to quick release valves 44 and then to service brake chambers 8. Higher pressure (175 psi) air is supplied from spring brake supply tank 62 along a line 74, through an inlet 76 of a modulated spring brake control valve 78, thorough an outlet 80, through a line 81, and to the first entrance port 49 of two-way check valve 50. The exit port 55 of valve 50 is connected to spring brake chambers 10 through quick release valve 52 and lines 56. The second entrance port 53 is coupled to line 72 through line 51. The pressure of the air supplied to spring brake chambers 10 will be the greater of the pressures at first and second entrance ports 49, 53, due to the operation of two-way check valve 50.

During normal operation with all brakes off, service brake application valve 68, coupled to the brake pedal (not shown) in the vehicle (not shown), is released or deactuated so that the air pressure in lines 70, 72 is atmospheric by being vented through an exhaust port 92 of valve 68. Also, during normal running operation, with all brakes off, line 74 is maintained at the pressure of tank 62 (typically 175 psi). To apply the service brakes, the user actuates valve 68 which supplies air from tank 64 at 100 psi to lines 70, 72 and 51; quick release valves 44 supply pressurized air to service brake chambers 8 so to apply the brakes at both the front and rear axles. Assuming valve 78 is deactuated so that line 81 is pressurized at 175 psi, two-way check valve 50 permits pressurized air in line 81 to pass through exit port 55, through quick release valve 52 through lines 56 and into spring brake chambers 10 so to keep the spring brakes fully deactuated. This prevents compounding of the forces created through service and spring brake chambers 8, 10 which could otherwise be generated by combination actuators 6.

Assuming service brake application valve 68 is deactuated, so that service brake chambers 8 and line 51 are vented to atmosphere, application of modulated spring brake control valve 78 vents part or all of the pressurized air within line 81 and thus within spring brake chambers 10. Doing so permits the actuator spring (not shown) associated with spring brake chamber 10 to apply the brakes at the rear axle in a controlled manner. Modulated spring brake control valve 78 may be of the type used as original equipment in European countries.

If one were to apply the service brakes, by actuating service brake application valve 68, as well as apply the spring brakes, by actuating modulated spring brake control valve 78, two-way check valve 50 will prevent excessive compounding. That is, while line 74 is fully pressurized with pressurized air from tank 62 at 175 psi (in the preferred embodiment), then air will be supplied to spring brake chambers 10 at this high pressure. By actuating valve 78 the pressure within line 74 can be reduced to a desired level, or simply brought down to the ambient atmospheric pressure. Once the pressure at first entrance port 49 drops below the pressure at second entrance port 53, two-way check valve 50 closes port 49 and permits pressurized air along line 72 to pass through exit port 55 and into spring brake chamber 10. Since the air pressure from tank 64 is lower than the air pressure in tank 62, and since the actuator spring of spring brake chamber 10 is sized to be fully compressed by the higher pressure (175 psi in the preferred embodiment) air from tank 62, there is some compounding of braking force from both the service brake chamber and spring brake chamber. However, the amount of compounding which occurs should not be unacceptable.

At FIG. 3 an alternative embodiment of the invention is shown with like parts referred to by like reference numerals. As can be seen by comparing system 60 with air brake system 100, service brake supply tanks 64 of system 60 have been replaced by a pair of service brake supply tanks 64a, 64b coupled to pressure reducing valve 66 along lines 26a and 26b, respectively. System 100 operates in the same manner as system 60 with tanks 64a and 64b providing approximately the same volume of pressurized air as tank 64. In comparing the conventional system 2 of FIG. 1 and system 100 of FIG. 3, it is seen that the major addition to the system is the inclusion of tank 64 so that system 100 may be quite useful in retrofit situations. System 100 may be preferred over system 60 when space limitations prohibit the use of a single large tank 64.

FIGS. 4 and 5 show air brake systems 61, 101 respectively. Systems 61, 101 are identical to systems 60, 100 but without two-way check valve 50. Therefore, application service and spring brake forces in systems 61, 101 are completely independent of one another. This permits compounding, which is desired in certain jurisdictions.

The use of two-way check valve 50 is a simple way to prevent or limit compounding in systems 60 and 100. If desired, systems 60 and 100 could be modified to prevent even the moderate compounding which could occur when both valves 68 and 78 are actuated. For example, a normally closed shut off valve 102, shown in FIGS. 6 and 7 could be used to control the exhausting of air through exhaust port 94 of valve 78. (Valve 102 could also be used in systems 61, 101 as well.) Valve 102 includes a body 104 having an inlet 106 and an outlet 108. A splined piston 110 has a head 112 which slides within the interior 114 of body 104 and a splined end 116b which slides within outlet 108. End 116 has axial splines 118 which guide end 116 within outlet 108 but permit air to easily pass from port 94, through interior 114 and out outlet 108.

Inlet 106 is coupled to line 72 by a connecting line 120. Actuation of valve 68 pressurizes lines 72, 120 so to push piston 110 to the right in FIG. 6 against the bias of a spring 122. Doing so causes rubber seal 124 to slide over and seal exhaust port 94. Therefore, if valve 78 is thereafter actuated, so to couple ports 80, 94, the pressure in line 54 will be maintained since the air in such line will be prevented from escaping through exhaust port 94. Thus, complete anticompounding is achieved with valve 102 regardless of the pressures applied to service and spring brake chambers 8, 10. Note that valve 102 will not prevent compounding in the unlikely event that the user actuates valve 78 before actuating valve 68. It may therefore be desired to use valve 102 in addition to two way check valve 50 as in FIGS. 2 and 3. In such case complete anticompounding is achieved if valve 68 is actuated before valve 78 while at least partial anticompounding is achieved if valve 78 is actuated before valve 68.

Although shut off valve 102 may be used with a conventional air brake system, such as system 2 of FIG. 1, to prevent compounding, such is not needed. Rather, as shown in the air brake system 170 of FIG. 8, the exhaust port 172 of parking brake control valve 46 could be coupled to line 40 by an anticompounding line 174. Doing so supplies pressurized air to exhaust port 172 whenever application valve 34 is actuated. When application valve 34 is not actuated, exhaust port 172 is coupled to atmosphere through line 174 and the exhaust port 176 of valve 34 to permit normal functioning of valve 46. Air brake system 170 thus provides for anticompounding using fewer components than system 2, thus reducing cost.

The direct coupling of line 40 to exhaust port 172 is simpler and less costly than the use of shut off valve 102 would be. However, it should be recognized that the anticompounding efficiency of system 170 may be less than would be achieved using a shut off valve 102. For example, assume the user activates valve 34. Doing so briefly drops the pressure in tank 22 a small amount, such as 5 psi. There is a certain lag time before the pressure supplied to port 172 by line 174 is the normal full pressure of the system (and thus the pressure in spring brake chamber 10). If valve 46 is actuated before the pressure in line 174 is equal to the pressure in line 48, the pressure in line 48 and spring brake chamber 10 will drop somewhat, possibly enough to permit the spring brakes to be applied to a small degree. If valve 46 were deactivated, which would seal port 172, before the pressure in lines 174, 48 and spring brake chamber 10 increased to the normal full pressure, then a small amount of compounding could occur. This aspect is not present when valve 102 is used.

Other modifications and variations can be made to the disclosed embodiments without departing from the subject of the invention as defined in the following claims. For example, instead of using a pressure reducing valve 66, separate compressors and governors could be used. Modulated spring brake control valve 78 may be made to be normally biased towards the deactivated position so that the spring brakes will be applied only while the handle of valve 78 is being held by the user. Valve 46 could be used instead of modulated valve 78 if desired.

What is claimed is:

1. A vehicle air brake system comprising:
   a combination brake actuator including a spring brake chamber and a service brake chamber;
   a first source of pressurized air at a first pressure;
   a second source of pressurized air at a second pressure, the first pressure being substantially higher than the second pressure;
   a spring brake control valve means for selectively fluidly coupling the spring brake chamber to the first pressure source and to atmosphere; and
   a service brake actuation valve means for selectively fluidly coupling the service brake chamber to the second pressure source and to atmosphere.

2. The system of claim 1 further comprising means for preventing coupling the spring brake chamber to atmosphere while the service brake chamber is fluidly coupled to the second pressure source.

3. The system of claim 2 wherein spring brake control valve includes an inlet coupled to the first pressure source, an outlet coupled to the spring brake chamber and an exhaust port, and wherein the coupling preventing means includes a shut off means, fluidly coupled to the service brake chamber, for sealing the exhaust port when the service brake chamber is fluidly coupled to the second pressure source.

4. The system of claim 3 wherein the shut off means includes a slide valve element.

5. The system of claim 1 wherein the first pressure is about 50% greater than the second pressure.

6. The system of claim 1 wherein the spring brake control valve means including a modulated spring brake control valve.

7. A vehicle air brake system comprising:
  a first source of pressurized air at a first pressure;
  a second source of pressurized air at a second pressure, said first pressure being substantially higher than said second pressure;
  a combination brake actuator including a spring brake chamber and a service brake chamber;
  a spring brake control valve including a first inlet fluidly coupled to the first source, a first outlet and a first exhaust port opening into the ambient atmosphere;
  whereby actuating the spring brake control valve fluidly couples the first outlet to the first exhaust port and deactuating the spring brake control valve fluidly couples the first inlet to the first outlet;
  a service brake application valve, including a second inlet fluidly coupled to the second air source, a second outlet fluidly coupled to the service brake chamber and a second exhaust port opening into the ambient atmosphere, for controlling the supply of pressurized air from the second air source to the service brake chamber;
  whereby actuating the service brake actuation valve fluidly couples the second inlet to the second outlet so air at the second pressure is applied to the service brake chamber, and deactuating the service brake application valve fluidly couples the second outlet to the second exhaust port so air in the service brake chamber is exhausted to atmosphere; and
  a two-way check valve having first and second entrance ports and an exit port, the exit port fluidly coupled to the spring brake chamber, the first entrance port fluidly coupled to the first outlet and the second entrance port fluidly coupled to the second outlet, the air pressure applied to the spring brake chamber through the exit port being the higher of the air pressures at the first and second entrance ports.

8. The system of claim 7 wherein the first pressure is at least about 50% greater than the second pressure.

9. The system of claim 7 wherein:
  the first air source includes an air compressor coupled to a first tank, the air in the first tank being at the first pressure; and
  the second air source includes a second tank coupled to the first tank through a pressure reducing valve so the air pressure in the second tank is at the second pressure.

10. The system of claim 7 wherein the spring brake control valve is a modulated spring brake control valve to permit the air pressure applied to the first entrance port to be controlled.

11. A vehicle air brake system comprising:
  a first source of pressurized air at a first pressure;
  a second source of pressurized air at a second pressure, said first pressure being substantially higher than said second pressure;
  a combination brake actuator including a spring brake chamber and a service brake chamber;
  a spring brake control valve including a first inlet fluidly coupled to the first source, a first outlet and a first exhaust port opening into the ambient atmosphere;
  whereby actuating the spring brake control valve fluidly couples the first outlet to the first exhaust port and deactuating the spring brake control valve fluidly couples the first inlet to the first outlet;
  a service brake application valve, including a second inlet fluidly coupled to the second air source, a second outlet fluidly coupled to the service brake chamber and a second exhaust port opening into the ambient atmosphere, for controlling the supply of pressurized air from the second air source to the service brake chamber;
  whereby actuating the service brake actuation valve fluidly couples the second inlet to the second outlet so air at the second pressure is applied to the service brake chamber, and deactuating the service brake application valve fluidly couples the second outlet to the second exhaust port so air in the service brake chamber is exhausted to atmosphere; and
  means for fluidly coupling the spring brake chamber to the first outlet, when the pressure at the first outlet is greater than the pressure at the second outlet, and for fluidly coupling the spring brake chamber to the second outlet, when the pressure at the second outlet is greater than the pressure at the first outlet.

12. The system of claim 11 wherein the first pressure is at least about 50% greater than the second pressure.

13. The system of claim 11 wherein:
  the first air source includes an air compressor coupled to a first tank, the air in the first tank being at the first pressure; and
  the second air source includes a second tank coupled to the first tank through a pressure reducing valve so the air pressure in the second tank is at the second pressure.

14. The system of claim 11 wherein the spring brake control valve is a modulated spring brake control valve to permit the air pressure applied to the first entrance port to be controlled.

15. A vehicle air brake system comprising:
  a first source of pressurized air at a first pressure;
  a second source of pressurized air at a second pressure, said first pressure being substantially higher than said second pressure;
  a combination brake actuator including a spring brake chamber and a service brake chamber;
  a spring brake control valve including a first inlet fluidly coupled to the first source, a first outlet and a first exhaust port opening into the ambient atmosphere;
  whereby actuating the spring brake control valve fluidly couples the first outlet to the first exhaust port and deactuating the spring brake control valve fluidly couples the first inlet to the first outlet;
  a service brake application valve, including a second inlet fluidly coupled to the second air source, a second outlet fluidly coupled to the service brake chamber and a second exhaust port opening into the ambient atmosphere, for controlling the supply of pressurized air from the second air source to the service brake chamber;

whereby actuating the service brake actuation valve fluidly couples the second inlet to the second outlet so air at the second pressure is applied to the service brake chamber, and deactuating the service brake application valve fluidly couples the second outlet to the second exhaust port so air in the service brake chamber is exhausted to atmosphere; and means for fluidly coupling the first outlet to the spring brake chamber when the pressure at the first outlet is about the first pressure, and for fluidly coupling the spring brake chamber to a third source of pressurized air when the pressure at the second outlet is about the second pressure and the pressure at the first outlet is less than the first pressure.

16. The system of claim 15 wherein the third source is the first outlet when the pressure at the first outlet is greater than the pressure at the second outlet, and the third source is the second outlet when the pressure at the first outlet is less than the pressure at the second outlet.

17. The system of claim 15 wherein the first pressure is at least about 50% greater than the second pressure.

18. The system of claim 15 wherein:
the first air source includes an air compressor coupled to a first tank, the air in the first tank being at the first pressure; and
the second air source includes a second tank coupled to the first tank through a pressure reducing valve so the air pressure in the second tank is at the second pressure.

19. The system of claim 15 wherein the spring brake control valve is a modulated spring brake control valve to permit the air pressure applied to the first entrance port to be controlled.

20. A method for increasing the braking force of a spring brake actuator of a combination service brake actuator/spring brake actuator in an air brake system, the spring brake actuator having an actuator spring exhibiting a first force at a full deflection when subjected to a service pressure, comprising the following steps:
replacing the actuator spring with a replacement spring exhibiting a second force at said full deflection, said second force being a chosen percentage greater than the first force;
providing a supplemental air source with air at a spring pressure which is greater than the service pressure by at least about the chosen percentage; and
coupling the supplemental air source to the spring brake actuator so air at the spring pressure deflects the replacement spring a distance equal to the full deflection.

21. The method of claim 20 wherein the chosen percentage is at least about 50%.

22. The method of claim 20 wherein the providing step includes the steps of providing air at the spring pressure to a first tank, and passing air from the first tank through a pressure reducing valve to supply a second tank with air at the service pressure.

23. The method of claim 22 further comprising the step of supplying air at the spring pressure from the first tank to a third tank.

24. The method of claim 23 wherein the second tank has a storage capacity substantially greater than the third tank.

25. A vehicle air brake system comprising:
a combination brake actuator including a spring brake chamber and a service brake chamber;
a source of pressurized air;
a spring brake control valve means for selectively fluidly coupling the spring brake chamber to the pressure source and to atmosphere, the spring brake control valve means including an inlet coupled to the first pressure source, an outlet coupled to the spring brake chamber and an exhaust port, the outlet and the exhaust port coupled to one another when the spring brake control valve is in a first operational condition:
a service brake actuation valve means for selectively fluidly coupling the service brake chamber to the pressure source and to atmosphere; and
means for preventing coupling the spring brake chamber to atmosphere while the service brake chamber is fluidly coupled to the second pressure source, the coupling preventing means including a shut off means, fluidly coupled to the service brake chamber, for sealing the exhaust port when the service brake chamber is fluidly coupled to the second pressure source.

26. The system of claim 25 wherein the shut off means includes a slide valve element.

27. A vehicle air brake system comprising:
a combination brake actuator including a spring brake chamber and a service brake chamber;
a source of pressurized air;
a spring brake control valve means for selectively fluidly coupling the spring brake chamber to the pressure source and to atmosphere, the spring brake control valve means including an inlet coupled to the first pressure source, an outlet coupled to the spring brake chamber and an exhaust port, the outlet and the exhaust port coupled to one another when the spring brake control valve is in a first operational condition;
a service brake actuation valve means for selectively fluidly coupling the service brake chamber to the pressure source and to atmosphere; and
an anticompounding line coupling the service brake chamber to the exhaust port of the spring brake control valve to supply pressurized air to said exhaust port when the service brake chamber is pressurized thereby at least partially preventing the exhaust of pressurized air from the spring brake chamber throught said exhaust port.

* * * * *